United States Patent [19]
Gommel

[11] Patent Number: 6,143,133
[45] Date of Patent: Nov. 7, 2000

[54] METHOD AND DEVICE FOR DRAINAGE OF A FIBROUS SUSPENSION

[75] Inventor: Axel Gommel, Ravensburg, Germany

[73] Assignee: Voith Sulzer Papiertechnik Patent GmbH, Ravensburg, Germany

[21] Appl. No.: 09/198,459

[22] Filed: Nov. 24, 1998

[30] Foreign Application Priority Data

Dec. 3, 1997 [DE] Germany .................. 197 53 604

[51] Int. Cl.⁷ .................. B01D 33/04; B01D 33/64; D21F 1/80
[52] U.S. Cl. .................. 162/208; 162/56; 162/358.1; 210/783; 210/784; 210/400; 210/402; 210/406
[58] Field of Search .................. 162/55, 56, 60, 162/210, 214, 317, 318, 323, 301, 329, 357, 372, 342, 208, 289, 299, 358.1; 210/783, 784, 400–402, 404, 406; 68/43, 22 R; 209/12.1, 17; 8/156

[56] References Cited

U.S. PATENT DOCUMENTS

| Re. 36,297 | 9/1999 | Heino et al. | 210/784 |
|---|---|---|---|
| 4,722,793 | 2/1988 | Seifert et al. | 210/401 |
| 4,879,034 | 11/1989 | Bastgen . | |
| 4,886,005 | 12/1989 | Burton, Jr. | 112/292 |
| 5,133,832 | 7/1992 | Gilkey | 162/4 |
| 5,186,791 | 2/1993 | Seifert et al. | 162/56 |
| 5,384,014 | 1/1995 | Bliss | 162/317 |
| 5,599,426 | 2/1997 | Hoffman . | |
| 5,656,165 | 8/1997 | Yamamoto et al. . | |
| 5,879,551 | 3/1999 | Kolmar et al. | 210/401 |
| 5,985,159 | 11/1999 | Strid et al. | 210/783 |

FOREIGN PATENT DOCUMENTS

| 0698480 | 2/1996 | European Pat. Off. . |
|---|---|---|
| 2051598 | 1/1981 | United Kingdom . |
| 95/30046 | 11/1995 | WIPO . |
| 96/08600 | 3/1996 | WIPO . |

*Primary Examiner*—Stanley S. Silverman
*Assistant Examiner*—José A. Fortuna
*Attorney, Agent, or Firm*—Greenblum & Bernstein, P.L.C.

[57] ABSTRACT

A method and device for drainage of a fibrous suspension where a converging drainage gap is formed between a first area and a second area. At least one of the first area or the second area is water permeable. A curved drainage zone is connected to the converging drainage gap. The first area moves relative to the second area. A fibrous suspension is introduced into the converging drainage gap. The fibrous suspension is transported by one of the first area and the second area as a layer. The first area and the second area are compressed closer together thereby causing drainage from the fibrous suspension through one of the first area or the second area.

38 Claims, 4 Drawing Sheets

METHOD AND DEVICE FOR DRAINAGE OF A FIBROUS SUSPENSION

CROSS-REFERENCE TO RELATED APPLICATIONS

The present application claims priority under 35 U.S.C. §119 of German Patent Application No. DE 197 53 604.2, filed Dec. 3, 1997, the disclosure of which is expressly incorporated by reference herein in its entirety.

BACKGROUND OF THE INVENTION

1. Field of the Invention

The present invention relates to fibrous suspensions in paper making, and more specifically to drainage of fibrous suspensions.

2. Discussion of Background Information

Processes for drainage of fibrous suspensions are used either to increase the pulp density of the fibrous suspension, or to remove unwanted components from the fibrous suspension by washing. Both procedures are linked to each other, since drainage is necessary to the washing of a fibrous suspension. Washing processes generally start from relatively low initial pulp densities (e.g. 0.5–3% by weight). The extent of the effect of washing a fibrous suspension depends on additional parameters, i.e., not just the increase in pulp density.

Drainage processes may be implemented with various known devices for draining a fibrous suspension. The most significant known devices are wire fabric type presses and filter presses.

In wire fabric presses, the fibrous suspension is introduced between a wire fabric and roller, or between two wire fabrics. The fibrous suspension is compressed such that part of the water is extruded. The introduction of the suspension is accomplished by means of either a stuff chest or by means of a head box. The suspension runs out of a stuff chest into the region of the wire fabric(s). A headbox forms a jet for introduction of the suspension. For technical reasons, i.e., sealing problems, the stuff chest cannot be used with suspension densities which are too thin. For suspensions with thin densities, a headbox is essential. Although current processes have achieved high standards, it is often impossible to control the washing effect as desired.

For a fibrous suspension with a low initial pulp density (e.g. 0.5–2% by weight), a large amount of water must be removed therefrom, causing the suspension to behave Theologically similar to water. Therefore, only a slight pressure may be applied, e.g. by crushing the layer or by lateral spurting, if one wishes to avoid problems. On the other hand, too low a pressure causes the effectiveness of the process to be inadequate.

In fibrous suspensions, maximum removal of solids is in many cases not essential or is even disadvantageous. Often, a large number of requirements must be weighed against each other when determining the amount of solid removal.

U.S. Pat. No. 5,599,426, discloses a washing process such that the filtrate which appears is returned in several stages into the suspension (i.e. returned to the countercurrent). It is known that the countercurrent process increases the effectiveness of the separation processes but is associated with significant process technology and equipment expenditure.

WO 96/08600 discloses drainage processes in which friction forces are intentionally generated between two areas, moved relative to each other, which are strong enough that tiny rolls of thickened fiber pulp are formed thereby. A vacuum is applied to aid this effect. However, the type of processes disclosed in WO 96/08600 can be performed reliably only with relatively high pulp densities.

SUMMARY OF THE INVENTION

Accordingly, the present invention is directed to a method and device for drainage of a fibrous suspension that substantially obviates one or more of the problems arising from the limitations and disadvantages of the related art.

It is an object of the present invention to provide a device for drainage of a fibrous suspension such that high drainage performance is obtained even with a simple device.

It is another object of the present invention to provide a device for drainage of fibrous suspension where a large part of the unintentionally washed out solids may be returned to the pulp.

Accordingly, one aspect of the present invention is directed to a method for drainage of a fibrous suspension that includes: forming a converging drainage gap between a first water permeable area and a second water impermeable area having a smooth surface, the converging drainage gap includes a curved drainage zone; moving the first area relative to the second area in a direction of motion; and introducing a fibrous suspension into the converging drainage gap, the fibrous suspension is transported by the first area as a layer.

According to another aspect of the present invention, the second area moves slower than the first area, or is stationary.

According to yet another aspect of the present invention, the second area has radii of curvature that decrease in the direction of motion.

According to a further aspect of the present invention, the drainage zone is formed by a portion of the converging drainage gap.

According to another aspect of the present invention, the drainage comprises water separated from the fibrous suspension.

According to yet another aspect of the present invention, the drainage comprises extremely fine solid particles separated from the fibrous suspension.

According to a further aspect of the present invention, the radii of curvature is at least 2 m at the beginning of the drainage zone.

According to another aspect of the present invention, the second area is formed by a fixed curved guide shoe, the first area being part of a wire fabric belt.

According to yet another aspect of the present invention, the second area is at least partially provided with a friction-reducing surface.

According to a further aspect of the present invention, the friction-reducing surface is polytetrafluoroethylene.

According to another aspect of the present invention, the second area is formed by an impermeable flexible band, which is guided in a curved path, the first area being part of a wire fabric belt.

According to yet another aspect of the present invention, the flexible band revolves at a speed which is significantly less than that of the first area.

According to a further aspect of the present invention, draining a majority of a filtrate radially from the drainage zone.

According to another aspect of the present invention, draining all of the filtrate radially from the drainage zone.

According to yet another aspect of the present invention, the fibrous suspension has a solid content between 0.3 and 2% by weight upon entering into the drainage zone.

According to a further aspect of the present invention, the layer transported by one of the first area and the second area in the region of the drainage zone has a maximum solid content of 8% by weight.

According to another aspect of the present invention, the layer transported by one of the first area and the second area in the region of the drainage zone has a maximum solid content of 5% by weight.

According to yet another aspect of the present invention, the first area is moved relative to the second area at a speed of at least 200 m/min.

According to a further aspect of the present invention, the first area is moved relative to the second area at a speed of at least 800 m/min.

According to another aspect of the present invention, a second suspension is added such that at least one additional point for adding the second suspension passes through the second area.

According to yet another aspect of the present invention, the addition of the second suspension into the layer occurs with such turbulence that the layer is substantially vortexed.

According to a further aspect of the present invention, the addition of the second suspension takes place on the side of the layer facing the second area such that the layer is not vortexed, but is retained as a precoat filtering layer.

According to another aspect of the present invention, the drainage zone is substantially horizontal.

According to yet another aspect of the present invention, the drainage zone has a downward course in the direction of motion, whereby the fibrous suspension is introduced at an upper end of the drainage zone.

According to a further aspect of the present invention, the drainage zone has an involute shape.

According to another aspect of the present invention, the second area contains longitudinal grooves.

According to yet another aspect of the present invention, the layer is guided on one of the first area or the second area that transports the layer into another drainage region after leaving the drainage zone.

According to a further aspect of the present invention, the filtrate penetrating through the first area is divided into at least a first filtrate, which appears first in the direction of motion, and into a second filtrate.

According to another aspect of the present invention, the first filtrate is at least partially applied at an addition point onto a layer of pulp already formed in the converging drainage gap.

According to yet another aspect of the present invention, the addition point is disposed on the second area.

According to a further aspect of the present invention, immediately upstream from the addition point, the space between the first area and the second area narrows and then widens again, such that an injector effect is generated by the transport motion of the layer.

According to another aspect of the present invention, the narrowing of the space between the first area and the second area is adjustable.

According to yet another aspect of the present invention, the narrowing is adjusted with a hinged flap.

According to a further aspect of the present invention, the present invention is directed to a device for drainage of a fibrous suspension that contains a first area that is water permeable and moves in a direction of motion, and a second area that is impermeable to water and has a smooth surface.

The first area and the second area form a converging drainage gap that includes a curved drainage zone. The second area is one of moving slower that the first area or is stationary. A headbox introduces a fibrous suspension into the converging drainage gap where the fibrous suspension is transported in the direction of motion as a layer by the first area, thereby causing drainage from the fibrous suspension.

According to another aspect of the present invention, the first area is part of a wire fabric belt.

According to yet another aspect of the present invention, at least one headbox introduces the fibrous suspension into the converging drainage gap.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PRESENT INVENTION

Figure 1:
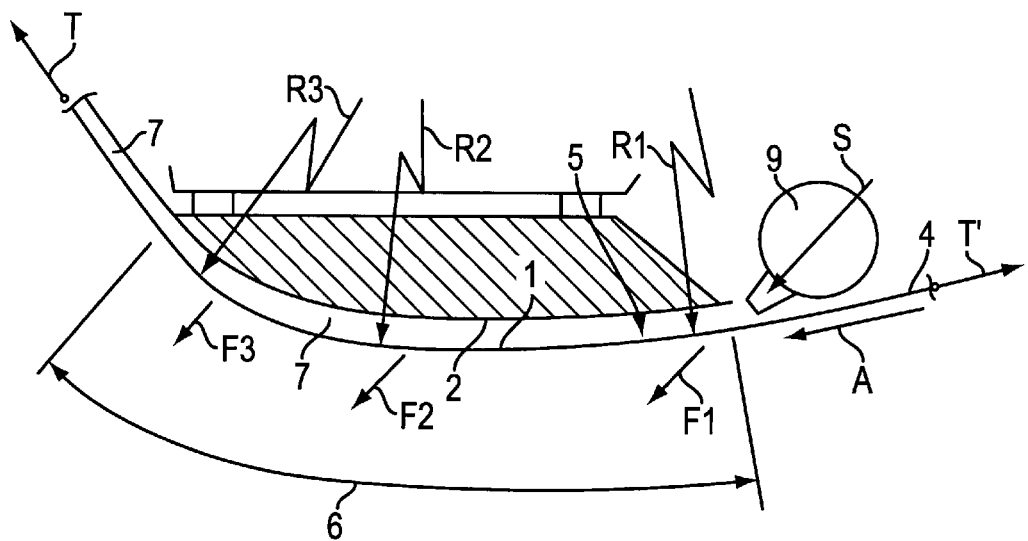
FIG. 1 is a partial side view of an exemplary device for drainage of a fibrous suspension according to the present invention that includes a stationary area.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The device and method for drainage of a fibrous suspension according to the present invention can be performed with devices which require only relatively few moving parts. Also, a good drainage or washing effect is possible overall even with the fibrous suspension added being of relatively low pulp density. The drainage zone can be designed such that the drainage pressure may be optimally tuned by the coordination of the two areas to the pulp conditions prevailing at the drainage zone location. A slight drainage pressure can be generated with the suspension at the beginning of the process when the suspension is still a very thin fluid. A higher drainage pressure can be generated between the two areas as the pulp density increases.

The invention offers special advantages if only pulp densities which are less than 8% by weight appear in the aforementioned drainage zone. The fibrous suspension is adequately lubricated due to the water. In this situation, only slight friction occurs on the interface between the layer and the area past which this layer is moved. The pulp layer slides over the area, and shearing forces appear causing only a certain relaxation without destroying the layer.

In the device and method for drainage of a fibrous suspension according to the present invention, contamination due to sedimentation need not be feared. Wire fabric wear is also very slight. Also, according to the present invention, the area may advantageously be very smooth, i.e., polished. A non-stick and/or friction-reducing coating on the area, such as polytetrafluoroethylene (Teflon) or ceramic, is also advantageous.

The device and method for drainage of a fibrous according to the present invention proceeds particularly favorably with a relatively low thickness of the suspension layer. Very good results are achieved when this layer has a maximum sheet weight of 200 g/m$^2$ absolutely dry. Also, the throughput can be high since relatively high speeds are possible without any disadvantage.

Also, the process according to the present invention offers the capability of returning part of the already collected filtrate to the pulp. This known filtrate return is carried out particularly advantageously, i.e., by feeding onto the side of the layer already formed opposite the permeable area. A feed point at which the pulp layer can already provide a certain filtration effect for the filtrate applied may be selected thereby for the filtrate. The filtrate must first penetrate the layer before it can flow out again. Thus, precisely the desired components of the recirculated filtrate are retained by the layer. The first filtrate also contains a relatively large amount of organic matter in addition to the inorganic solids. These are the fiber fines and fiber fragments which contribute to sheet stability. After recirculation and re-feeding, the substances arrive at a point on the already thickened pulp layer from which the water must first flow through before it has reached the permeable area, for example, the wire fabric. Here, the fiber fragments cling to the other pulp because of their size and affinity and do not return to the filtrate.

FIG. 1 is an partial side view of an exemplary device for drainage of a fibrous suspension according to the present invention, and shows a first area 1 and a second area 2, whereby these areas are disposed such that a converging drainage gap 5 with a curved drainage zone 6 is formed. The first area 1 is located on an only partially depicted endless wire fabric belt 4. In this embodiment, the second area 2 is stationary, whereas the wire fabric belt 4 is moved in the direction of motion A relative to second area 2. By means of wire fabric tension (arrows T, T), the wire fabric belt 4 is pressed against a curved area, in this case, the second area 2. This creates pressure between the two areas 1 and 2, therefore contributing to the drainage of the fibrous suspension. The drainage is also aided by a centrifugal force that occurs radially outward. Advantageously, the second area 2 is designed such that the first area 1 pressed against it assumes a shape with varying radii of curvature R1, R2, and R3. The radii of curvature decrease in the direction of motion A, i.e., the curve becomes sharper. In FIG. 1, only three radii of curvature R1, R2, and R3 are depicted. The pressure increases between the areas with a decreasing radius of curvature. The relatively large initial radius of curvature R1 results in the formation of a protective mat, whereby the desired retention of pulp is improved.

In the converging drainage gap 5, fibrous suspension S is sprayed in using a headbox 9, for example, in the form of a flat jet. Since the first area 1 is water-permeable, filtrate F1, F2, F3 passes through it. The remaining fibrous suspension is thickened such that a layer 7, which is transported on the first area 1, is formed. The figures shown are not drawn to scale, but are intended merely to clarify the necessary steps in execution of the process according to the present invention.

Figure 2:
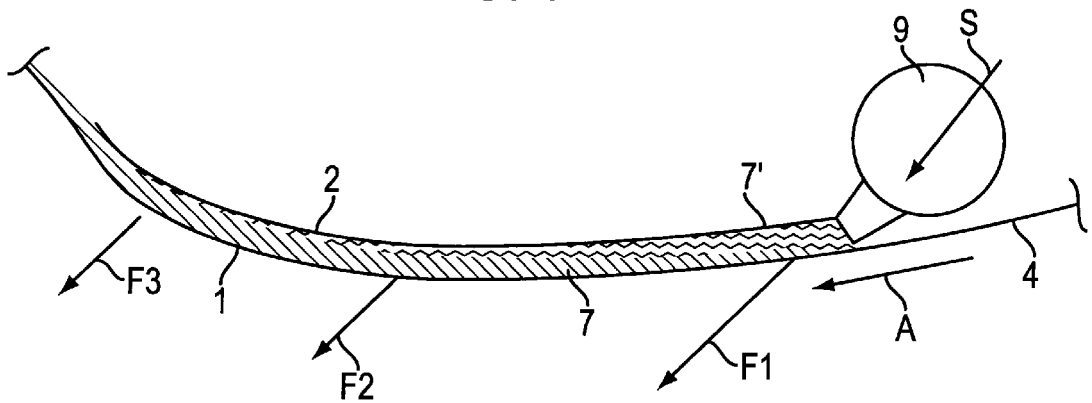
FIG. 2 is a partial side view of an exemplary device for drainage of a fibrous suspension according to the present invention showing states and layers of a fibrous suspension.

FIG. 2 is a partial side view showing the states of the fibrous suspension S supplied by headbox 9 depicted in their various stages. A layer 7, which is located on the first area 1 and is transported by it in the direction of motion A, is shown. Layer 7 has already been pre-drained such that it has a certain structure. Between layer 7 and the second area 2, there is a layer of suspension 7', that contains more water than layer 7. Since the second area 2, in contrast to the first area 1, is water-impermeable, the fibrous suspension S added has a tendency to remain wetter in the vicinity of headbox 9 than on the other side, in the vicinity of the first area 1. FIG. 2 is only exemplary regarding the respective thickness and the boundary between the two layers. As a result of the differences in water content of the two layers, the aforementioned favorable conditions occur with the movement of the moving layer 7 along the stationary second face 2. Since the layer of suspension 7' serves as a wet lubricating layer, friction can remain low. Therefore, disturbances in layer 7, which is already structured and necessary as a precoat filtering layer, are avoided.

Figure 3:
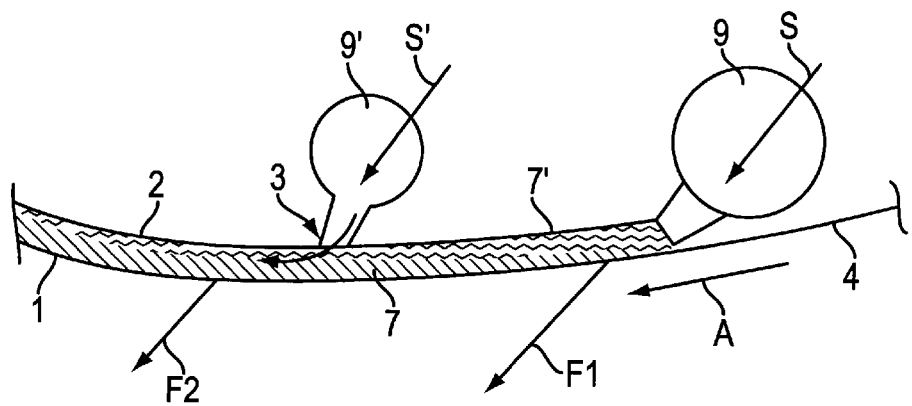
FIG. 3 is a partial side view of an exemplary device for drainage of a fibrous suspension according to the present invention showing multiple layers of fibrous suspensions.

FIG. 3 is a partial side view of an exemplary device for drainage of a fibrous suspension according to the present invention that includes supplying multiple layers of fibrous suspension. In FIG. 3, additional suspension S' is added through an additional headbox 9'. This can preferably occur in drainage zone 6 through the second area 2. As shown in FIG. 3, with the appropriate selection of operating parameters, the additional fibrous suspension S' is introduced directly into the thin-fluid layer of suspension 7' such that the already formed layer 7 is not torn. The first filtrate F1 may advantageously be recirculated into the pulp layer at this location. This mode of operation increases the yield and promotes the selectivity of the washing.

Figure 4:
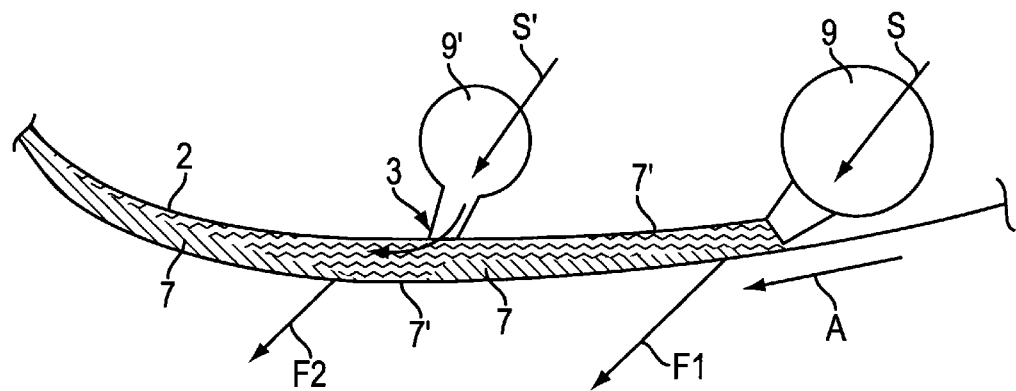
FIG. 4 is a partial side view of an exemplary device for drainage of a fibrous suspension according to the present invention where the process is performed for a stronger washout effect.

In other cases, it may be desirable to heavily mix the fibrous suspension S', added with the additional headbox 9', with the layer 7 already formed, such that as many solid particles as possible are washed out of the fibrous suspension S' added. This objective may be achieved by turbulence which can be generated very simply with appropriate speed at headbox in 9'. Thus, depending on the requirements, the process may be performed such that a lower wash-out effect (as shown in FIG. 3) or a stronger wash-out effect (as shown in FIG. 4) is set.

In the aforementioned examples, in which additional fluid is added to the suspension S already in the drainage gap, a particularly advantageous capability is offered during performance of the process. As a result of the motion, which the fibrous suspension S carries out along with one of the two areas (e.g. wire fabric belt 4), a suction is generated which may be used during the feeding of the additional fluid. This can also be characterized as special form of the injector principle. The suction attainable depends on the geometric relationships and the relative speed between the fibrous suspension S and the additional fluid from second headbox 9'.

Figure 5:
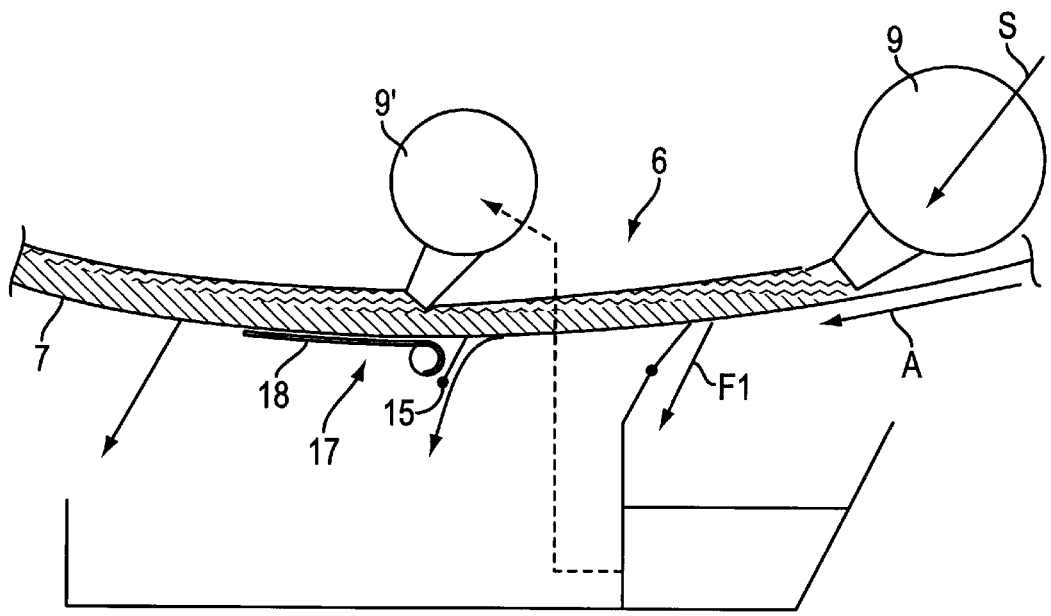
FIG. 5 is a partial side view of an exemplary device for drainage of a fibrous suspension according to the present invention that contains an additional suction measure.

FIG. 5 shows an additional measure to increase the suction, where the space between the first and second areas is expanded in the region of second headbox 9'. Depending on the existing conditions, the pressure reduction (according to Bernoulli) in the region of the flow expansion can be so great that the fluid in headbox 9' does not have to be pumped in, but rather is automatically sucked in. This can be an advantage if, for example, at this location the first filtrate F1 collected in the open filtrate reservoir is to be recirculated. It may be reasonable to apply a sealing arrangement 17 to the water-permeable area, i.e., in this case, to the wire fabric belt 4, such that the sealing prevents the sucking in of air or the back suction of water into the pulp layer. This sealing arrangement may be a flexible impermeable strip 18.

Figure 6:
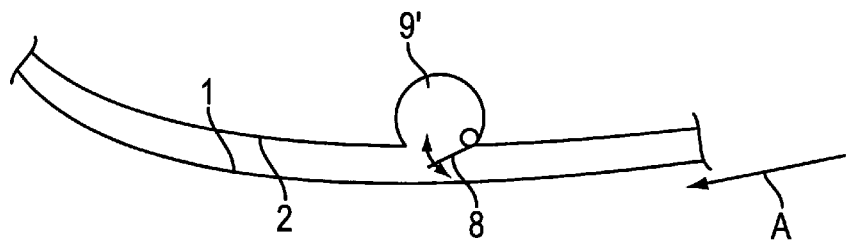
FIG. 6 is a partial side view of an exemplary device for drainage of a fibrous suspension according to the present invention that contains an adjustable flap.

FIG. 6 shows that the inflow location may also be provided with an adjustable flap 8 which can influence the flow and pressure relationships.

Figure 7:
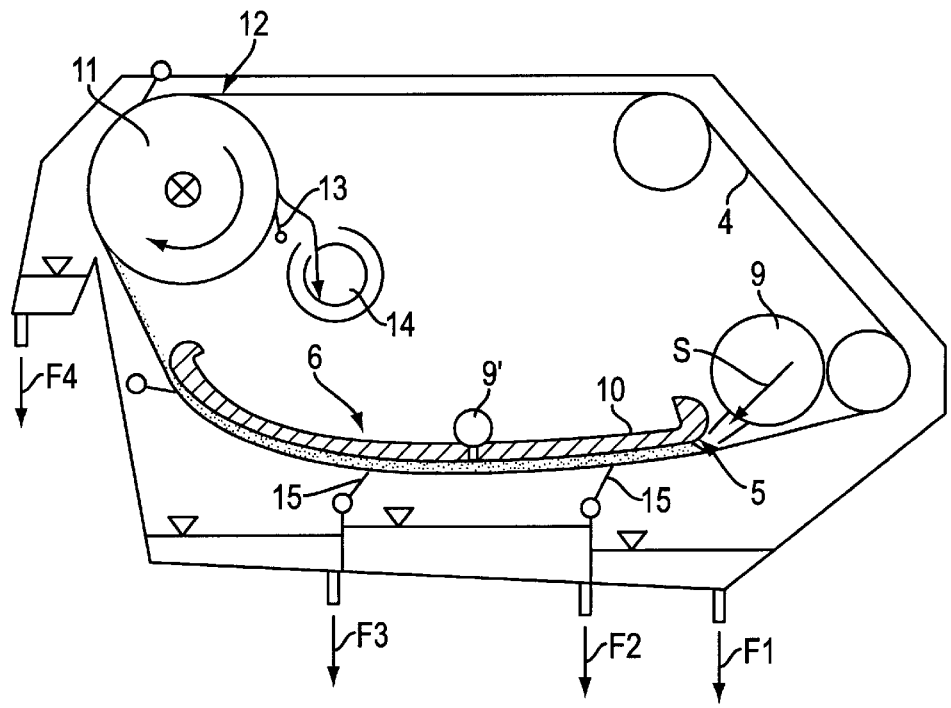
FIG. 7 is a schematic side view of an exemplary device for drainage of a fibrous suspension according to the present invention.

FIG. 7 shows, in simplified form, a drainage device with which the process according to the present invention can be performed. In this device, the second area is located on a curved guide shoe 10, which is installed in an essentially horizontal position. The first area is part of the revolving wire fabric belt 4, and is pressed against the guide shoe 10 from below by tension devices (not shown). The suspension S arrives via a headbox 9 into the converging drainage gap 5 being formed. The drainage zone 6 is located between the wire fabric belt 4 and the guide shoe 10. After the fibrous suspension S has passed the drainage zone 6, it is transported by the wire fabric belt 4 to a drainage roller 11, on which it is further drained as a result of the pressure generated by the wire fabric tension. Expediently, the radius of curvature of the drainage roller 11 is smaller than the radius of curvature of the guide shoe 10, therefore the drainage pressure can again be increased thereby. At the separation point 12 between the wire fabric belt 4 and the drainage roller 11, the thickened fibrous suspension clings to the drainage roller 11, is removed from this by a doctor blade 13, and removed from the device by a discharger 14. The drainage roller 11 usually runs with the wire fabric belt 4, or drives it. However, drainage roller 11 can also have a relative speed as compared to the wire fabric belt 4, or drainage roller 11 may be stationary.

The water pressed out of the fibrous suspension S in FIG. 7 arrives as a filtrate to appropriate collection points, where four different qualities of filtrate, F1 through F4, are recovered. If the filtrate is not centrifuged out, or is only inadequately centrifuged out, doctor blades 15 may be placed against the running wire fabric belt 4. The type of division into different qualities of filtrate is left up to the person skilled in the trade and is adapted to the requirements of the process. This device also has a second headbox 9', which is disposed such that either additional suspension or filtrate, for example, the first filtrate F 1, can be introduced from it through the guide shoe 10 into the drainage zone 6. The associated mechanisms and capabilities have already been explained with reference to FIGS. 2 through 4.

Figure 8:
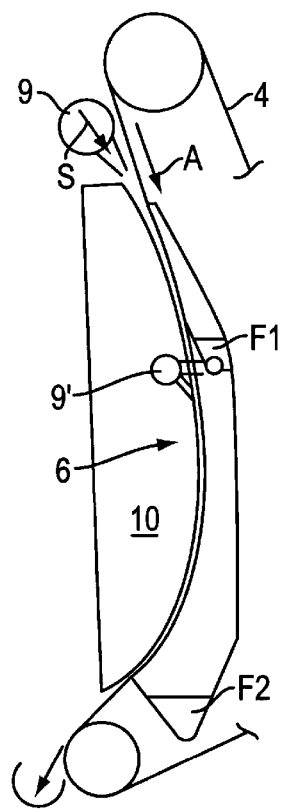
FIG. 8 is a schematic side view of an exemplary device for drainage of a fibrous suspension according to the present invention where the direction of motion is downward.

FIG. 8 shows the part of a device for performance of the process according to the present invention whereby the direction of motion A has an essentially downward course. In this arrangement, the feeding of the suspension S into the drainage zone 6 is made easier. Also, the aforementioned self suction of the first filtrate F1 can be very simply enabled. The thickened suspension is removed here without additional application of pressure by the wire fabric belt 4.

Figure 9:
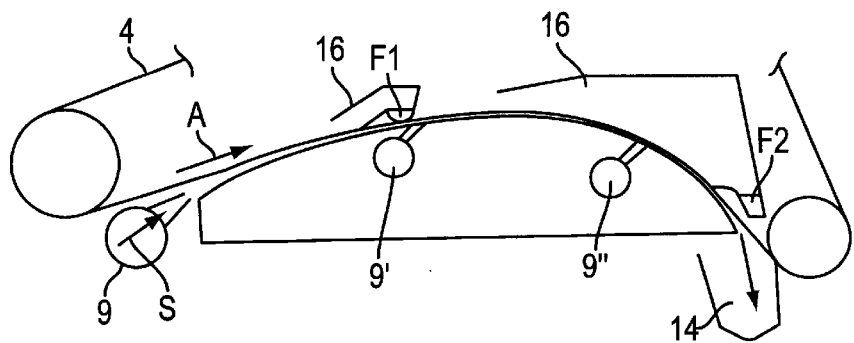
FIG. 9 is a partial side view of an exemplary device for drainage of a fibrous suspension according to the present invention having a different flow management.

FIG. 9 shows the process according to the present invention having a different flow management. The filtrate F1 and F2 arrives in the collection reservoirs 16 which are positioned above the drainage zone. Doctor blades may be necessary in the removal of the filtrate. This device also includes a third headbox 9". The third headbox enables greater throughput.

Figure 10:
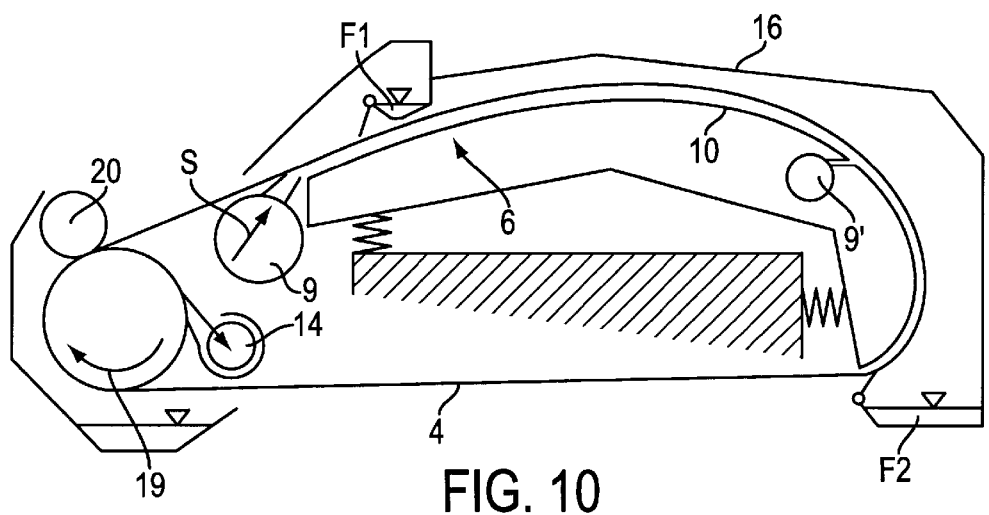
FIG. 10 is a schematic side view of an exemplary device for drainage of a fibrous suspension according to the present invention that contains a long pressing region.

FIG. 10 shows a device for performance of the process according to the present invention that includes a relatively long region in which the wire fabric belt 4 is pressed against a guide shoe 10, which may be flexibly supported as shown. The drainage zone 6 thus formed begins with a rising section followed by a substantially horizontal region and continues until the course of the wire fabric belt has been almost completely reversed. It then runs back to the deflection roller 19, where further drainage occurs due to the wire fabric tension. If the deflection roller 19 is simultaneously used as a drive roller, a counter roller 20 may be expedient. Then, the wire fabric tension can be kept as low as necessary, and blockage in the relatively long drainage zone is avoided. The radius of curvature decreases significantly in the path of the direction of motion A, which as already mentioned, gradually increases the drainage pressure. Advantageously, the radius of the deflection roller 19 is smaller than the minimum radius of curvature on the guide shoe 10.

Figure 11:
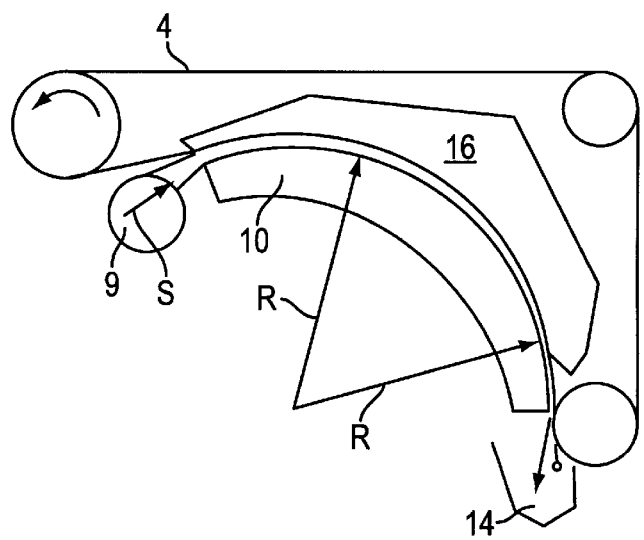
FIG. 11 is a schematic side view of an exemplary device for drainage of a fibrous suspension according to the present invention containing a constant radius of curvature.

FIGS. 1 through 10 depict forms of the second area 2 whereby the radii of curvature viewed in the direction of motion A decrease constantly. In contrast, the second area shown in FIG. 11 has a constant radius of curvature R, and is designed as a partial cylindrical area. This makes it possible to further simplify the device. Also, the drainage effect begins more rapidly.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular means, materials, and embodiments, the present invention is not intended to be limited to the particulars disclosed herein; rather, the present invention extends to all functionally equivalent structures, methods and uses, such as are within the scope of the appended claims.

What is claimed is:

1. A method for drainage of a fibrous suspension comprising:
   forming a converging drainage gap between a first water permeable area and a second water impermeable area the second water impermeable area having a smooth surface so that the fibrous suspension slides along the smooth surface, the converging drainage gap including a curved drainage zone;
   moving the first area relative to the second area in a direction of motion; and
   introducing a fibrous suspension into the converging drainage gap, the fibrous suspension being transported by the first area as a layer.

2. The method according to claim 1, wherein the second area is one of moving slower than the first area and stationary.

3. The method according to claim 1, wherein a water lubricating layer is formed along the smooth surface.

4. The method according to claim 1, the drainage zone formed by a portion of the converging drainage gap.

5. The method according to claim 1, the drainage comprising water separated from the fibrous suspension.

6. The method according to claim 1, the drainage comprising fine solid particles separated from the fibrous suspension.

7. The method according to claim 1, the drainage zone being substantially horizontal.

8. The method according to claim 1, the second area being formed by a fixed curved guide shoe, the first area being part of a wire fabric belt.

9. The method according to claim 1, the second area being at least partially provided with a friction-reducing surface.

10. The method according to claim 9, the friction-reducing surface being polytetrafluoroethylene.

11. The method according to claim 1, the second area being formed by an impermeable flexible band, which is guided in a curved path, the first area being part of a wire fabric belt.

12. The method according to claim 11, the flexible band being a revolving band revolving at a speed which is significantly less than that of the first area.

13. The method according to claim 1, draining a majority of a filtrate radially from the drainage zone.

14. The method according to claim 13, draining all of the filtrate radially from the drainage zone.

15. The method according to claim 13, the filtrate penetrating through the first area being divided into at least a first filtrate, which appears first in the direction of motion, and into a second filtrate.

16. The method according to claim 1, the layer transported by one of the first area and the second area in the region of the drainage zone having a maximum solid content of 8% by weight.

17. The method according to claim 1, the layer transported by one of the first area and the second area in the region of the drainage zone having a maximum solid content of 5% by weight.

18. The method according to claim 1, the first area being moved relative to the second area at a speed of at least 200 m/min.

19. The method according to claim 1, the first area being moved relative to the second area at a speed of at least 800 m/min.

20. The method according to claim 1, the second area having radii of curvature that decrease in the direction of motion.

21. The method according to claim 20, the radii of curvature being at least 2 m at the beginning of the drainage zone.

22. The method according to claim 1, the fibrous suspension having a solid content between 0.3 and 2% by weight upon entering into the drainage zone.

23. The method according to claim 1, the drainage zone having a downward course in the direction of motion, whereby the fibrous suspension is introduced at an upper end of the drainage zone.

24. The method according to claim 1, the drainage zone having an involute shape.

25. The method according to claim 1, the second area containing longitudinal grooves.

26. The method according to claim 1, the layer being guided on one of the first area and the second area that transports the layer into another drainage region after leaving the drainage zone.

27. A method for drainage of a fibrous suspension comprising:
   forming a converging drainage gap between a first water permeable area and a second water impermeable area having a smooth surface, the converging drainage gap including a curved drainage zone;
   moving the first area relative to the second area in a direction of motion; and
   introducing a fibrous suspension into the converging drainage gap, the fibrous suspension being transported by the first area as a layer,
   where a second suspension is added such that at least one additional point for adding the second suspension passes through the second area.

28. The method according to claim 27, the addition of the second suspension into the layer occurring with such turbulence that the layer is substantially vortexed.

29. The method according to claim 27, the addition of the second suspension taking place on the side of the layer facing the second area such that the layer is not vortexed, but is retained as a precoat filtering layer.

30. A method for drainage of a fibrous suspension comprising:
   forming a converging drainage gap between a first water permeable area and a second water impermeable area having a smooth surface, the converging drainage gap including a curved drainage zone;
   moving the first area relative to the second area in a direction of motion; and introducing a fibrous suspension into the converging drainage gap, the fibrous suspension being transported by the first area as a layer,
   draining a majority of a filtrate radially from the drainage zone, wherein the filtrate penetrating through the first area is divided into at least a first filtrate, which appears first in the direction of motion, and into a second filtrate; and
   applying, at an addition point, at least a part of the first filtrate onto a layer of pulp already formed in the converging drainage gap.

31. The method according to claim 30, the addition point being disposed on the second area.

32. The method according to claim 31, where immediately upstream from the addition point, the space between the first area and the second area narrows and then widens again, such that an injector effect is generated by the transport motion of the layer.

33. The method according to claim 32, where the narrowing of the space between the first area and the second area is adjustable.

34. The method according to claim 33, the narrowing being adjusted with a hinged flap.

35. A device for drainage of a fibrous suspension comprising:

a first area, said first area being water permeable and moving in a direction of motion;

a second area having a smooth surface, said second area being impermeable to water, said second area and said first area forming a converging drainage gap that includes a curved drainage zone in which the fibrous suspension is adapted to slide along said smooth surface, said second area being one of moving slower than said first area and being stationary; and a headbox, said headbox introducing a fibrous suspension into the converging drainage gap, the fibrous suspension being transported in the direction of motion as a layer by said first area, thereby causing drainage from the fibrous suspension.

36. The device according to claim 35, comprising at least one headbox, the at least one headbox introducing the fibrous suspension into the converging drainage gap.

37. The device according to claim 35, comprising a wire fabric belt, said first area being part of said wire fabric belt.

38. The device according to claim 35, wherein said second area is arranged so that a water lubricating layer is formed adjacent to said smooth surface.

* * * * *